United States Patent
Guo et al.

(10) Patent No.: US 11,095,679 B2
(45) Date of Patent: Aug. 17, 2021

(54) METHOD AND APPARATUS FOR PROCESSING ACCOUNT IN BLOCKCHAIN, STORAGE MEDIUM, AND COMPUTER DEVICE

(71) Applicant: TENCENT TECHNOLOGY (SHENZHEN) COMPANY LIMITED, Guangdong (CN)

(72) Inventors: Rui Guo, Shenzhen (CN); Mao Cai Li, Shenzhen (CN); Jian Jun Zhang, Shenzhen (CN); Hai Tao Tu, Shenzhen (CN); Qi Zhao, Shenzhen (CN); Zong You Wang, Shenzhen (CN); Jun Liang, Shenzhen (CN); Da Wei Zhu, Shenzhen (CN); Bin Hua Liu, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 309 days.

(21) Appl. No.: 16/435,992

(22) Filed: Jun. 10, 2019

(65) Prior Publication Data
US 2019/0297109 A1 Sep. 26, 2019

Related U.S. Application Data

(63) Continuation of application No. PCT/CN2018/077391, filed on Feb. 27, 2018.

(30) Foreign Application Priority Data

Feb. 27, 2017 (CN) .......................... 201710110736.8

(51) Int. Cl.
*H04L 29/06* (2006.01)
*G06F 16/182* (2019.01)
(Continued)

(52) U.S. Cl.
CPC ...... *H04L 63/1441* (2013.01); *G06F 16/1824* (2019.01); *G06Q 20/382* (2013.01);
(Continued)

(58) Field of Classification Search
CPC ..... H04L 63/1441; H04L 9/0825; H04L 9/14; H04L 2209/38; H04L 63/10;
(Continued)

(56) References Cited

U.S. PATENT DOCUMENTS 10,114,970 B2 * 10/2018 Goldfarb ............... H04L 9/0643
2015/0348017 A1 * 12/2015 Allmen ................ G06Q 20/401
705/76

(Continued)

FOREIGN PATENT DOCUMENTS

CN 101431561 A 5/2009
CN 103873437 A 6/2014
(Continued)

OTHER PUBLICATIONS

Bonneau et al. " SoK: Research Perspectives and Challenges for Bitcoin and Cryptocurrencies", 2015 IEEE Symposium on Security and Privacy, 2015, pp. 104-121.
(Continued)

*Primary Examiner* — Joseph P Hirl
*Assistant Examiner* — Thomas A Gyorfi
(74) *Attorney, Agent, or Firm* — Sughrue Mion, PLLC

(57) ABSTRACT

A method for processing an account in a blockchain is provided. A freezing instruction with respect to a target account is received by a computer device. A freezing lock is generated by the computer device based on the received freezing instruction, the freezing lock including a freezing lock public key. A first freezing request is generated by the computer device based on the freezing instruction and the freezing lock public key. The first freezing request is trans-
(Continued)

mitted by the computer device to a device in the blockchain. The first freezing request is a request based on which the target account is frozen by using the freezing lock and resource transfer of the target account is denied.

20 Claims, 5 Drawing Sheets

(51) Int. Cl.
| | | |
|---|---|---|
| *H04L 9/08* | (2006.01) | |
| *H04L 9/14* | (2006.01) | |
| *G06Q 20/40* | (2012.01) | |
| *G06Q 20/38* | (2012.01) | |

(52) U.S. Cl.
CPC ....... *G06Q 20/3829* (2013.01); *G06Q 20/405* (2013.01); *H04L 9/0825* (2013.01); *H04L 9/14* (2013.01); *H04L 2209/38* (2013.01)

(58) Field of Classification Search
CPC ............... H04L 9/0631; G06Q 20/405; G06Q 20/3829; G06Q 20/382; G06Q 2220/00; G06Q 20/065; G06F 16/1824
See application file for complete search history.

(56) References Cited

U.S. PATENT DOCUMENTS

| | | |
|---|---|---|
| 2016/0254910 A1 | 9/2016 | Finlow-Bates |
| 2017/0013047 A1 | 1/2017 | Hubbard et al. |
| 2017/0091750 A1* | 3/2017 | Maim ................ H04L 9/30 |
| 2017/0278186 A1* | 9/2017 | Creighton, IV ..... G06Q 20/401 |
| 2018/0082267 A1* | 3/2018 | Sheerin ................ G06Q 20/065 |
| 2018/0082268 A1* | 3/2018 | Sheerin ................ G06Q 20/06 |
| 2018/0082287 A1* | 3/2018 | Sheerin ................ G06Q 20/065 |

FOREIGN PATENT DOCUMENTS

| | | |
|---|---|---|
| CN | 104751323 A | 7/2015 |
| CN | 104753886 A | 7/2015 |
| CN | 105096118 A | 11/2015 |
| CN | 105468994 A | 4/2016 |
| CN | 106096926 A | 11/2016 |
| CN | 106296138 A | 1/2017 |
| CN | 107067255 A | 8/2017 |
| WO | 2017/011601 A1 | 1/2017 |

OTHER PUBLICATIONS

Communication dated Mar. 27, 2021 by the Indian Patent Office in application No. 201947022629.
Communication dated Feb. 24, 2021 by the European Patent Office in application No. 18758390.1.
Written Opinion dated May 2018 by the International Searching Authority in application No. PCT/CN2018/077391.
First Office Action of Chinese Application No. 201710110736.8 dated May 30, 2018.
Second Office Action of Chinese Application No. 201710110736.8 dated Aug. 2, 2018.
International Search Report of PCT/CN2018/077391 dated May 29, 2018 [PCT/ISA/210] English Translation.
Written Opinion of PCT/CN2018/077391 dated May 29, 2018 [PCT/ISA/237].

* cited by examiner

| Account address | Freezing type | Freezing lock public key | Account private key signature |
|---|---|---|---|

FIG. 3

| Account address | Freezing lock public key | Freezing lock private key signature | Account private key signature |
|---|---|---|---|

FIG. 4

METHOD AND APPARATUS FOR PROCESSING ACCOUNT IN BLOCKCHAIN, STORAGE MEDIUM, AND COMPUTER DEVICE

CROSS-REFERENCE TO RELATED APPLICATION(S)

This application is a continuation application of International Application No. PCT/CN2018/077391, filed with the Chinese Patent Office on Feb. 27, 2018, which claims priority to Chinese Patent Application No. 201710110736.8, entitled "METHOD AND APPARATUS FOR PROCESSING ACCOUNT IN BLOCKCHAIN", filed with the Chinese Patent Office on Feb. 27, 2017, the disclosures of which are herein incorporated by reference in their entireties.

BACKGROUND

1. Field

The example embodiments relate to the field of blockchains, and particular, to a method and an apparatus for processing an account in a blockchain, a storage medium, and a computer device.

2. Description of the Related Art

In a blockchain, if a user finds that a private key of an account has a risk of leakage, the user may perform a method of transferring account assets to another account owned by the user. However, when performing this method, the following problems exist:

1. The user only suspects that the account is leaked, and does not want to abandon the account until leakage is confirmed. For example, the account is a recipient account released by the user to a customer of the user, and it takes time to release a new account.

2. The account has a transaction that is not pending and is soon to be completed. While assets in the account may be transferred, assets to be received (or incoming assets) are still at risk to be lost.

For the foregoing problems, no effective solution is proposed yet.

SUMMARY

One or more example embodiments provide a method and an apparatus for processing an account in a blockchain, a storage medium, and a computer device, to resolve at least a technical problem of account insecurity caused by leakage of an account private key.

According to an aspect of an example embodiment, a method for processing an account in a blockchain is provided. A freezing instruction with respect to a target account is received by a computer device. A freezing lock is generated by the computer device based on the received freezing instruction, the freezing lock including a freezing lock public key. A first freezing request is generated by the computer device based on the freezing instruction and the freezing lock public key. The first freezing request is transmitted by the computer device to a device in the blockchain. The first freezing request is a request based on which the target account is frozen by using the freezing lock and resource transfer of the target account is denied.

According to an aspect of an example embodiment, provided is an apparatus for processing an account in a blockchain, including: at least one memory operable to store program code; and at least one processor operable to read the program code and operate as instructed by the program code. The program code includes first receiving code configured to cause the at least one processor to receive a freezing instruction with respect to a target account; first generation code configured to cause the at least one processor to generate a freezing lock based on the received freezing instruction, the freezing lock including a freezing lock public key; second generation code configured to cause the at least one processor to generate a first freezing request based on the freezing instruction and the freezing lock public key; and first transmitting code configured to cause the at least one processor to transmit the first freezing request to a device in the blockchain, the first freezing request being a request based on which the target account is frozen by using the freezing lock and resource transfer of the target account is denied.

According to an aspect of an example embodiment, provided is a non-transitory computer storage medium storing instructions executable by at least one processor to perform: receiving a freezing instruction with respect to a target account; generating a freezing lock based on the received freezing instruction, the freezing lock including a freezing lock public key; generating a first freezing request based on the freezing instruction and the freezing lock public key; and transmitting the first freezing request to a device in a blockchain, the first freezing request being a request based on which the target account is frozen by using the freezing lock and resource transfer of the target account is denied.

According to an aspect of an example embodiment, a method for processing an account in a blockchain is provided. The method includes: receiving, by a computer device, a freezing instruction sent by a user, the freezing instruction being used for instructing to freeze a target account; generating, by the computer device, a freezing lock according to the received freezing instruction, the freezing lock including a freezing lock public key; generating, by the computer device, a first freezing request according to the freezing instruction and the freezing lock public key, the first freezing request being used for requesting to freeze the target account by using the freezing lock; and sending, by the computer device, the freezing request to a device in a blockchain, so that the device in the blockchain records a freezing event according to the freezing request, the freezing event being used for instructing the device in the blockchain to reject to perform resource transfer on the target account.

According to an aspect of an example embodiment, a method for processing an account in a blockchain is further provided. The method includes: receiving, by a device in a blockchain, a first freezing request, the first freezing request being generated according to a freezing instruction sent by a user and a freezing lock public key, the first freezing request being used for requesting to freeze a target account, a freezing lock being generated according to the freezing instruction sent by the user, and the freezing lock including the freezing lock public key; verifying, by the device in the blockchain, the first freezing request; and recording, by the device in the blockchain, a freezing event according to the first freezing request when the first freezing request is successfully verified, the freezing event being used for instructing the device in the blockchain to reject to perform resource transfer on the target account.

According to an aspect of an example embodiment, an apparatus for processing an account in a blockchain is further provided. The apparatus includes: a first receiving unit, configured to receive a freezing instruction sent by a user, the freezing instruction being used for instructing to freeze a target account; a first generation unit, configured to generate a freezing lock according to the received freezing instruction, the freezing lock including a freezing lock public key; a second generation unit, configured to generate a first freezing request according to the freezing instruction and the freezing lock public key, the first freezing request being used for requesting to freeze the target account by using the freezing lock; and a first sending unit, configured to send the first freezing request to a device in a blockchain, so that the device in the blockchain records a freezing event according to the first freezing request, the freezing event being used for instructing the device in the blockchain to reject to perform resource transfer on the target account.

According to an aspect of an example embodiment, an apparatus for processing an account in a blockchain is further provided. The apparatus includes: a third receiving unit, configured to receive, by using a device in a blockchain, a first freezing request, the first freezing request being generated according to a freezing instruction sent by a user and a freezing lock public key, the first freezing request being used for requesting to freeze a target account, a freezing lock being generated according to the freezing instruction sent by the user, and the freezing lock including the freezing lock public key; a second verification unit, configured to verify, by using the device in the blockchain, the first freezing request; and a third recording unit, configured to record, by using the device in the blockchain, a freezing event according to the first freezing request when the first freezing request is successfully verified, the freezing event being used for instructing the device in the blockchain to reject to perform resource transfer on the target account.

According to an aspect of an example embodiment, a storage medium is further provided. The storage medium includes a stored program, and the program is configured to perform any one of the foregoing methods when run.

According to an aspect of an example embodiment, a computer device is further provided. The computer device includes a memory, a processor, and a computer program stored on the memory and capable of being run on the processor, and the processor is configured to perform any one of the foregoing methods through the computer program.

In the example embodiments, a freezing instruction sent by a user is received, the freezing instruction being used for instructing to freeze a target account; a freezing lock is generated according to the received freezing instruction, the freezing lock including a freezing lock public key; a first freezing request is generated according to the freezing instruction and the freezing lock public key, the first freezing request being used for requesting to freeze the target account by using the freezing lock; and the first freezing request is sent to a device in a blockchain, so that the device in the blockchain records a freezing event according to the first freezing request, the freezing event being used for instructing the device in the blockchain to reject to perform resource transfer on the target account. The freezing lock is generated, and the target account is frozen by using the freezing lock public key in the freezing lock, to ensure security of the target account, and to achieve a technical effect of ensuring account security when the account private key is leaked, thereby solving the technical problem in the related art of account insecurity caused by leakage of the account private key.

BRIEF DESCRIPTION OF THE DRAWINGS

These and/or other aspects will become apparent and more readily appreciated from the following description of the embodiments, taken in conjunction with the accompanying drawing.

FIG. 3 is a schematic diagram of first data generated in an optional method for processing an account in a blockchain according to an embodiment.

FIG. 4 is a schematic diagram of an unfreezing request generated in an optional method for processing an account in a blockchain according to an embodiment.

DETAILED DESCRIPTION

Figure 1:
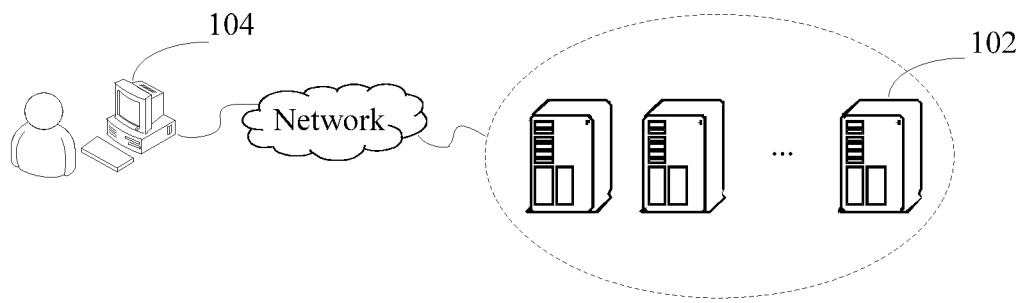
FIG. 1 is a schematic diagram of a hardware environment of a method for processing an account in a blockchain according to an embodiment.

To make a person skilled in the art better understand solutions of the disclosure, the following clearly and completely describes the technical solutions in the embodiments with reference to the accompanying drawings. Apparently, the described embodiments are merely some rather than all of the embodiments of the disclosure. All other embodiments that can be obtained by a person of ordinary skill in the art based on the example embodiments of the disclosure without creative efforts shall fall within the protection scope.

It should be noted that in the specification, claims, and accompanying drawings, the terms "first", "second", and the like are intended to distinguish between similar objects rather than indicating a specific order. It should be understood that data used in this way can be interchanged in an appropriate case, so that the embodiments that are described herein can be implemented in a sequence other than those sequences illustrated or described herein. Moreover, the terms "include", "contain" and any other variants mean to cover the non-exclusive inclusion. For example, a process, method, system, product, or device that includes a series of operations or units is not necessarily limited to those operations or units that are expressly listed, but may include other operations or units not expressly listed or inherent to such a process, method, product, or device.

First, for some of terms described in the example embodiments, the following explanations are provided:

Freezing lock: a freezing lock may be a pair of public and private keys that are temporarily generated. In the disclosure, an account is locked, that is, frozen, by submitting a freezing lock public key to a device network in a blockchain, and an account is correspondingly unlocked, that is, unfrozen, by submitting a freezing lock private key signature to a device network in a blockchain.

According to an embodiment, a method for processing an account in a blockchain is provided.

The method for processing an account in a blockchain according to an embodiment may be used in a situation in which when a user finds that a private key of a target account has a risk of leakage or a specific loss is caused by leakage of a private key, the target account is rapidly frozen through a freezing lock, to ensure security of the target account. In a case where the private key of the target account is suspected to be leaked, but the user cannot determine an actual situation thereof and the user does not want to immediately abandon the account before leakage is formally confirmed, the target account is rapidly frozen through the freezing lock, to ensure security of the target account. After the user determines that the private key of the target account is not leaked, the target account is unfrozen. If the user considers that whether the private key of the target account is leaked cannot be confirmed, or after the user can confirm that the private key of the target account is leaked, resources in the target account can be transferred to a new account.

For example, the private key of the target account is kept by several people. When a user A learns that the target account has a transaction for an unknown cause, the user A suspects that the private key of the target account may be leaked. In this case, the user A may select to immediately freeze the target account and completely forbids the target account from having a transaction, to ensure security of the target account. Afterward, the user A as well as other users that keep the private key of the target account may determine whether the unknown transaction is initiated by other users. Upon confirmation that the unknown transaction is initiated by other users, it may be determined that the private key of the target account is not leaked, and the user A may unfreeze the target account. On the other hand, upon confirmation that the private key of the target account is leaked, the user A may maintain a frozen state of the target account. The user may repeatedly freeze the target account, so that the target account is in a multi-locked state. In addition, the target account in the multi-locked state cannot be unlocked through a single "key". Only after the frozen target account is completely unfrozen, the target account can recover to a normal tradable state. Repeated freezing may improve security of the target account. The user may also perform incomplete freezing on the target account. For example, when the user confirms that the private key of the target account is leaked, if complete freezing is performed on the target account, the target account cannot receive a resource transferred to the target account. Therefore, before the user notifies other users of a new account, the user may select to perform incomplete freezing on the target account, so that the target account can receive the resource transferred to the target account. However, resources in the target account cannot be transferred out, and after the user notifies other users of a new account address, the user then initiates a resource transfer request to transfer the resource in the target account to the new account.

A blockchain is a brand-new distributed-infrastructure and computing-paradigm that uses a block-chain data structure to verify and store data, a distributed-node-consensus algorithm to generate and upgrade data, cryptography to safeguard a process of data transmission and data access, and smart contracts, consisting of automated scripts to write code and process data. A device in a blockchain is equivalent to a node in the blockchain, and the blockchain may include a plurality of nodes. The node may be a server 102 or a terminal 104.

Optionally, in an example embodiment, the foregoing method for processing an account in a blockchain may be applied to a hardware environment that includes the server 102 and the terminal 104 as shown in FIG. 1. The terminal 104 or the server 102 is a computer device. The user A may initiate a freezing request or an unfreezing request through the computer device. Optionally, when the terminal 104 deals with a freezing request or an unfreezing request sent by a user B through another terminal or server, the terminal 104 may be considered as a node in a blockchain. The terminal 104 or the server 102, that is, the computer device, may be considered as a node in the blockchain.

As shown in FIG. 1, the server 102 is connected to the terminal 104 through a network. The network includes but is not limited to: a wide area network, a metropolitan area network, or a local area network, and the terminal 104 is not limited to a PC, a mobile phone, a tablet computer, or the like. The method for processing an account in a blockchain in an example embodiment may be performed by the server 102, or may be performed by the terminal 104, or may be performed by the server 102 and the terminal 104 together. The terminal 104 performs the method for processing an account in a blockchain in an example embodiment, and alternatively, the method may be performed by a client installed on the terminal 104. The method for processing an account in a blockchain is described below by using the client installed on the terminal 104 as an example.

Figure 2:
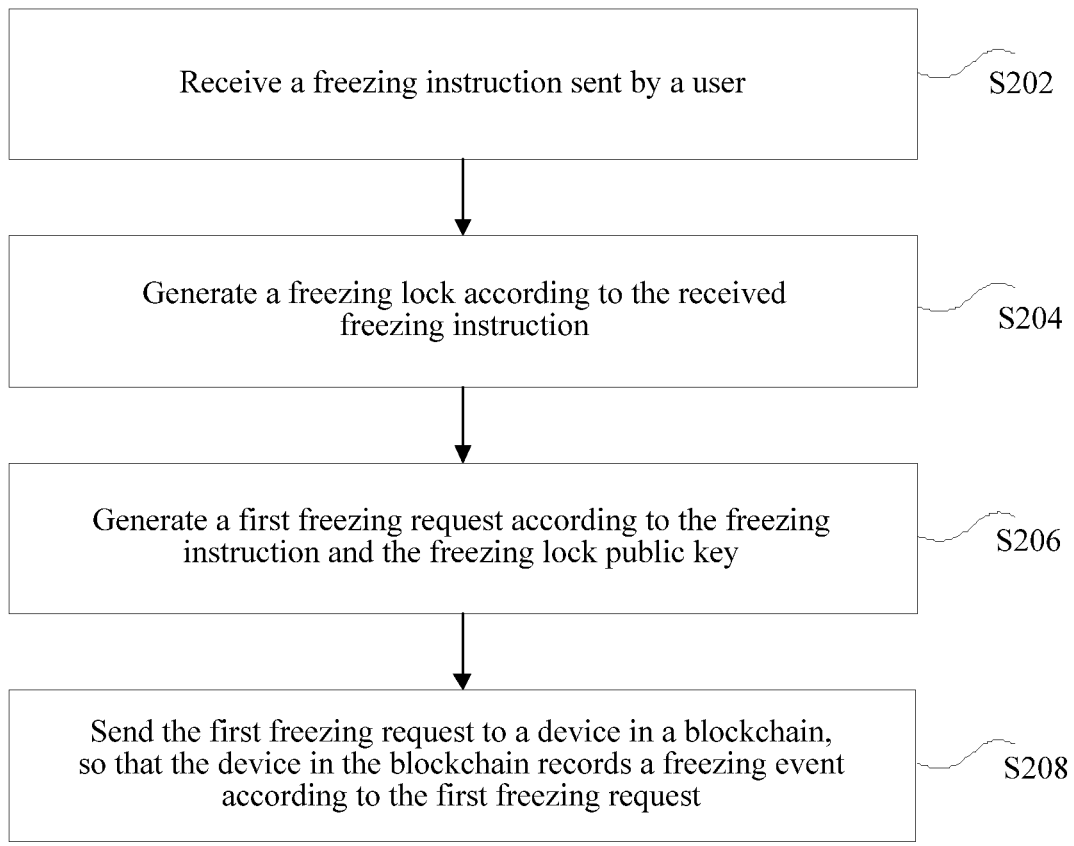
FIG. 2 is a flowchart of an optional method for processing an account in a blockchain according to an embodiment.

FIG. 2 is a flowchart of an optional method for processing an account in a blockchain according to an embodiment. As shown in FIG. 2, the method may include the following operations:

Operation S202: A client receives a freezing instruction sent by a user, the freezing instruction being used for instructing to freeze a target account.

Operation S204: The client generates a freezing lock according to the received freezing instruction, the freezing lock including a freezing lock public key.

Operation S206: The client generates a first freezing request according to the freezing instruction and the freezing lock public key, the first freezing request being used for requesting to freeze the target account by using the freezing lock.

Operation S208: The client sends the first freezing request to a device in a blockchain, so that the device in the blockchain records a freezing event according to the first freezing request, the freezing event being used for instructing the device in the blockchain to reject (or deny) to perform resource transfer on the target account.

That the foregoing operations are performed by the client is only for illustrative description, and the operations may also be performed by a computer device or the like.

According to the foregoing operations S202 to S208, the freezing lock is generated, and the target account is frozen by using the freezing lock public key in the freezing lock, to resolve a technical problem of account insecurity caused by leakage of the account private key, to achieve a technical effect of ensuring account security when the account private key is leaked.

In the technical solution provided in operation S202, when the user finds that the account private key of the target account has a risk of leakage, or a loss is caused because the account private key of the target account is leaked, or the target account is frozen by an unknown person, the user may send a freezing instruction to the client, to freeze the target account, to ensure security of the target account. In an optional embodiment, the target account may be frozen by the private key of the target account, when the user finds that the target account is frozen by an unknown person, it indicates that the unknown person owns the private key of the target account, and the private key of the target account is already leaked. Optionally, after the user sends the freezing instruction, the client receives the freezing instruction sent by the user, to freeze the target account according to an indication of the freezing instruction, and resources in the frozen target account cannot be transferred, thereby ensuring security of the account.

In the technical solution provided in operation S204, the client generates a freezing lock according to the received freezing instruction and freezes the target account through the freezing lock, to ensure security of the target account. Optionally, the foregoing freezing lock is a pair of temporary public and private keys, including a freezing lock public key and a freezing lock private key. The freezing lock public key is submitted to the device in the blockchain to lock the target account to freeze the target account. After the account is frozen, the user may submit the freezing lock private key to the device in the blockchain, to release a corresponding lock, that is, unlock the target account that is locked by a freezing lock corresponding to the freezing lock public key.

In the technical solution provided in operation S206, the client generates the first freezing request according to the indication of the freezing instruction and the freezing lock public key in the freezing lock. The first freezing request is submitted to the device in the blockchain, so that the device in the blockchain rejects to perform resource transfer on the target account.

In the technical solution provided in operation S208, the client sends the first freezing request to the device in the blockchain, and the device in the blockchain records a freezing event according to the received first freezing request, and after recording the freezing event, rejects, according to the recorded freezing event, to perform resource transfer on the target account, in accordance with freezing of the target account and to ensure security of the target account.

Optionally, operation S204 in which the client generates the first freezing request according to the freezing instruction and the freezing lock public key may include: obtaining an account address of the target account, a private key of the target account, and the freezing lock public key according to the freezing instruction; signing the account address of the target account and the freezing lock public key by using the private key of the target account, to obtain first data, which may include a private key signature of the target account and may also include at least one of the account address of the target account and the freezing lock public key, the private key signature of the target account being signature data obtained by signing at least one of the account address of the target account and the freezing lock public key by using the private key of the target account; and generating the first freezing request according to the first data, the first freezing request including the account address of the target account, the freezing lock public key, and the private key signature of the target account.

In an optional embodiment, when freezing the target account, the client uses the account address of the target account as an identifier of the target account, and by generating the freezing lock, submits the freezing lock public key to the device in the blockchain, to lock the target account by using a lock corresponding to the freezing lock. In addition, the user having the private key of the target account may freeze the target account. Therefore, when generating the first freezing request, the client obtains, according to the freezing instruction sent by the user, an account address of a target account to be frozen, a private key of the target account, and a freezing lock public key, then signs the account address of the target account and the freezing lock public key by using the private key of the target account, obtains first data according to the account address of the target account, the freezing lock public key, and a private key signature of the target account, and finally, generates a first freezing request according to the first data. The first freezing request may include the account address of the target account, the freezing lock public key, and the private key signature of the target account. After the first freezing request is sent to the device in the blockchain, the device in the blockchain may reject, according to the first freezing request, to perform resource transfer on the target account, in accordance with freezing of the target account.

Optionally, after the client sends the first freezing request to the device in the blockchain, the method further includes: verifying, by the device in the blockchain, the private key signature of the target account according to the first freezing request; recording, by the device in the blockchain, the account address of the target account and the freezing lock public key after verification is successfully performed; and recording, by the device in the blockchain, the freezing event according to the first freezing request, the freezing event being used for instructing to freeze the target account by using the freezing lock public key.

In an optional embodiment, the device in the blockchain may verify the received freezing request, and after verification is passed, freezes the target account. Optionally, after the client sends the generated first freezing request to the device in the blockchain, the device in the blockchain verifies the private key signature of the target account in the first freezing request. The private key of the target account and the public key of the target account are a key pair. Generally, the private key of the target account is only known to the user. In other words, the private key of the target account may be used for representing legitimacy of the user. During verification, the first freezing request may be decrypted by using the public key of the target account (that is, the private key signature of the target account in the first freezing request is verified). That the first freezing request can be decrypted indicates that the used public key and the private key for signature are a pair of keys, and the private key is the private key of the target account of the user, and that verification is passed. After verification is passed, the device in the blockchain determines legitimacy of recording of the account address of the target account and the freezing lock public key and records the account address and the freezing lock public key in the freezing event, to freeze a target account corresponding to a target address according to a freezing lock associated with the freezing lock public key. Optionally, after recording the freezing event, the device in the blockchain rejects to perform resource transfer of some types on the target account.

Optionally, the first freezing request includes a freezing type, and that the client sends the first freezing request to the device in the blockchain, so that the device in the blockchain records the freezing event according to the first freezing request includes: sending the first freezing request to the device in the blockchain, to instruct the device in the blockchain to reject, according to the first freezing request, to perform resource transfer of the freezing type on the target account.

The disclosure further provides one or more optional embodiments. In an optional embodiment, the first freezing request generated at the client further includes a freezing type, to perform freezing corresponding to the freezing type on the target account. Optionally, the freezing type may be but not limited to "freezing that completely forbids transactions" or "freezing that forbids only asset transfer-out", or the like. To ensure account security, the freezing type forbids at least asset transfer-out. Optionally, the client may sign the account address of the target account, the freezing lock public key, and the foregoing freezing type by using the private key of the target account, to obtain the first data, then generates the first freezing request according to the first data, and finally, sends the first freezing request to the device in the blockchain, to reject to perform resource transfer defined in the freezing type on the target account corresponding to the target address after the device in the blockchain successfully verifies the first freezing request.

FIG. 3 is a schematic diagram of first data generated in an optional method for processing an account in a blockchain according to an embodiment. As shown in FIG. 3, the client signs the account address of the target account, the freezing type, and the freezing lock public key to obtain the first data, and the generated first data includes the account address of the target account, the freezing type, the freezing lock public key, and the private key signature of the account.

Optionally, after the client sends the first freezing request to the device in the blockchain, so that the device in the blockchain records the freezing event according to the first freezing request, the method further includes: receiving, by the client, an unfreezing instruction sent by the user, the unfreezing instruction being used for instructing to unfreeze the target account that is frozen by using the freezing lock; generating, by the client, an unfreezing request according to the unfreezing instruction and a freezing lock private key, the unfreezing request being used for requesting to unfreeze the target account by using the freezing lock private key, and the freezing lock private key matching the freezing lock public key; and sending, by the client, the unfreezing request to the device in the blockchain, so that the device in the blockchain records an unfreezing event according to the unfreezing request, the unfreezing event being used for instructing the device in the blockchain to unfreeze the target account that is frozen by using the freezing lock.

In an optional embodiment, after the target account is frozen, the target account may also be unfrozen. Optionally, the user sends the unfreezing instruction, and the client receives the unfreezing instruction sent by the user and generates the unfreezing request according to the unfreezing instruction and the freezing lock private key. The freezing lock private key herein matches the freezing lock public key that freezes the target account, and the target account that is frozen by using the freezing lock public key matching the freezing lock private key can be unfrozen by using the freezing lock private key. The client sends the unfreezing request to the device in the blockchain, and the device in the blockchain records the unfreezing event according to the unfreezing request and allows, according to the recorded unfreezing event, to perform resource transfer on the target account, to unfreeze the target account. It should be noted that the device in the blockchain can unfreeze, according to the unfreezing event recorded in the unfreezing request, the target account that is frozen by using the freezing lock public key matching the freezing lock private key. When the target account is frozen by a plurality of freezing locks, a single unfreezing request can unlock only a freezing lock corresponding to the freezing lock private key included in the unfreezing request, and the target account cannot be completely unfrozen.

Optionally, an operation in which the client generates the unfreezing request according to the unfreezing instruction and the freezing lock private key may include: obtaining an account address of the target account, a private key of the target account, and the freezing lock public key according to the unfreezing instruction; signing the account address of the target account and the freezing lock public key by using the freezing lock private key, to obtain a freezing lock private key signature; signing the account address of the target account, the freezing lock public key, and the freezing lock private key signature by using the private key of the target account, to obtain second data; and generating the unfreezing request according to the second data, the unfreezing request including the account address of the target account, the freezing lock public key, the freezing lock private key signature, and the second data.

In an optional embodiment, when the target account is unfrozen, the account address of the target account is also used as the identifier of the target account, and the target account is unlocked by using the freezing lock private key matching the freezing lock public key provided during freezing. In addition, the user having the private key of the target account may also unfreeze the target account. Therefore, when generating the unfreezing request, the client obtains, according to the unfreezing instruction sent by the user, an account address of a target account to be unfrozen, a private key of the target account, and a freezing lock public key that freezes the target account, then signs the address of the target account and the freezing lock public key by using the freezing lock private key, to obtain a freezing lock private key signature, then signs the address of the target account, the freezing lock public key, and the freezing lock private key signature for the second time by using the private key of the target account, to obtain second data, and finally generates an unfreezing request according to the second data.

FIG. 4 is a schematic diagram of an unfreezing request generated in an optional method for processing an account in a blockchain according to an embodiment. As shown in FIG. 4, the generated second data includes the account address of the target account, the freezing lock public key, the freezing lock private key signature, and an account private key signature of the target account.

Optionally, that the client generates the unfreezing request according to the unfreezing instruction and the freezing lock private key includes: obtaining an account address of the target account, a private key of the target account, and the freezing lock public key according to the unfreezing instruction; signing the account address of the target account, the freezing lock public key, and the freezing lock private key by using the private key of the target account, to obtain third data; and finally generating the unfreezing request according to the third data, the unfreezing request including the account address of the target account, the freezing lock public key, the freezing lock private key, and the third data.

In an optional embodiment, the client may generate the unfreezing request in another manner. Optionally, the client obtains, according to the unfreezing instruction sent by the user, an account address of a target account to be unfrozen, a private key of the target account, and a freezing lock public key that freezes the target account, then signs the account address of the target account, the freezing lock public key, and the freezing lock private key by using the private key of the target account, to obtain third data, and further generates an unfreezing request according to the third data. The unfreezing request generated according to the third data includes the account address of the target account, the freezing lock public key, the freezing lock private key, and the third data.

It should be noted that if the private key of the target account is leaked, for example, the private key of the target account is obtained by a hacker, the hacker may also freeze the target account by using the obtained private key, that is, the target account is repeatedly frozen by the hacker after the user freezes the target account, so that the target account is in a multi-locked state. When the target account is in the multi-locked state, any single "key" (or freezing lock private key) cannot completely remove the target account from the frozen state. In such a case, although the hacker repeatedly freezes the target account, and consequently, the user cannot unfreeze the target account, resources in the target account are secure. In this case, the user can transfer, by using an account resource transfer method, resources in the target account to a new account when the target account is not unfrozen.

According to another embodiment, a method for processing an account in a blockchain is further provided.

Figure 5:
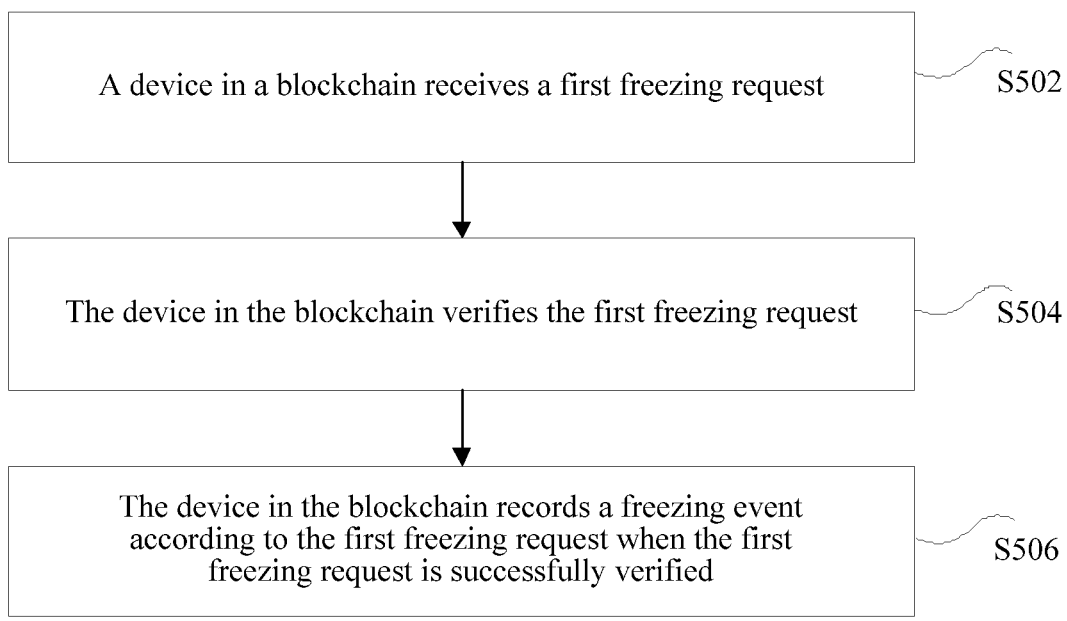
FIG. 5 is a flowchart of another optional method for processing an account in a blockchain according to an embodiment.

FIG. 5 is a flowchart of another optional method for processing an account in a blockchain according to an embodiment. As shown in FIG. 5, the method may include the following operations:

Operation S502: A device in a blockchain receives a first freezing request, the first freezing request being generated according to a freezing instruction sent by a user and a freezing lock public key, the first freezing request being used for requesting to freeze a target account, a freezing lock being generated according to the freezing instruction sent by the user, and the freezing lock including the freezing lock public key.

Operation S504: The device in the blockchain verifies the first freezing request.

Operation S506: The device in the blockchain records a freezing event according to the first freezing request when the first freezing request is successfully verified, the freezing event being used for instructing the device in the blockchain to reject to perform resource transfer on the target account.

According to the foregoing operations S502 to S506, the device in the blockchain receives the first freezing request, and the target account is frozen by using the freezing lock public key according to the first freezing request, to solve a technical problem of account insecurity caused by leakage of the account private key, and to achieve a technical effect of ensuring account security when the account private key is leaked.

Optionally, verification by the device in the blockchain of the first freezing request in operation S504 may include: obtaining, by the device in the blockchain, a public key of the target account; verifying, by the device in the blockchain by using the public key of the target account, first data that is in the first freezing request and that is obtained by signing an account address of the target account and the freezing lock public key by using a private key of the target account; and recording, by the device in the blockchain, the freezing lock public key carried in the first freezing request and the account address of the target account when the first data is successfully verified.

In an optional embodiment, after the device in the blockchain receives the first freezing request, a private key signature of the target account needs to be verified, to confirm an identity of a user that initiates the first freezing request. Optionally, after receiving the first freezing request, the device in the blockchain verifies the private key signature of the target account in the first freezing request. Optionally, the device in the blockchain obtains the public key of the target account from a certificate authority and verifies the private key signature of the target account in the first freezing request by using the public key of the target account. The blockchain usually includes a plurality of nodes. Each node verifies the private key signature of the target account according to the public key of the target account, and based on a majority of the plurality of nodes passing verification, verification of the device in the blockchain for the first freezing request is considered to be passed. In response to verification of the device in the blockchain for the first freezing request being passed, the device in the blockchain obtains the account address of the target account and the freezing lock public key, to record the freezing event according to the obtained account address and freezing lock public key and reject, according to the recorded freezing event, to perform any resource transfer on the target account.

Optionally, after the device in the blockchain records the freezing event according to the first freezing request, the method further includes: receiving, by the device in the blockchain, an unfreezing request, the unfreezing request being generated according to an unfreezing instruction sent by the user and a freezing lock private key, the unfreezing request being used for requesting to unfreeze the target account that is frozen by using the freezing lock, the unfreezing request further carrying a freezing lock public key, the freezing lock public key carried in the unfreezing request being the same as the freezing lock public key carried in the freezing request, and the freezing lock private key matching the freezing lock public key; verifying, by the device in the blockchain, a freezing lock private key signature and second data in the unfreezing request, or verifying, by the device in the blockchain, third data in the unfreezing request, the freezing lock private key signature being obtained by signing the account address of the target account and the freezing lock public key by using the freezing lock private key, the second data being obtained by signing the account address of the target account, the freezing lock public key, and the freezing lock private key signature by using the private key of the target account, and the third data being obtained by signing the account address of the target account, the freezing lock public key, and the freezing lock private key by using the private key of the target account; and recording, by the device in the blockchain, an unfreezing event according to the account address and the freezing lock public key when the freezing lock private key signature and the second data are successfully verified or when the third data is successfully verified, the unfreezing event being used for instructing the device in the blockchain to unfreeze the target account that is frozen by using the freezing lock.

In an optional embodiment, after the target account is frozen, the target account may also be unfrozen. Optionally, the user sends the unfreezing instruction, and the client receives the unfreezing instruction sent by the user and generates the unfreezing request according to the unfreezing instruction, the freezing lock public key, and the freezing lock private key. The freezing lock private key herein matches the freezing lock public key that freezes the target account, and the target account that is frozen by using the freezing lock public key matching the freezing lock private key may and can be unfrozen by using the freezing lock private key. The client sends the unfreezing request to the device in the blockchain, and the device in the blockchain receives the unfreezing request and verifies data in the unfreezing request. The unfreezing request is generated by the client. Optionally, the client may sign the account address of the target account and the freezing lock public key by using the freezing lock private key to obtain a freezing lock private key signature, then signs the account address of the target account, the freezing lock public key, and the freezing lock private key signature by using the private key of the target account, to obtain second data, and finally generates the unfreezing request according to the second data. Alternatively, the client may sign the account address of the target account, the freezing lock public key, and the freezing lock private key by using the private key of the target account, to obtain third data, and finally generates the unfreezing request according to the third data. The device in the blockchain may verify the signature in the unfreezing request. Optionally, when the unfreezing request is generated according to the second data, the device in the blockchain may verify the freezing lock private key signature and the second data. When the unfreezing request is generated according to the third data, the device in the blockchain needs to verify the third data. When successfully verifying the third data, the device in the blockchain records the unfreezing event according to the unfreezing request and allows, according to the recorded unfreezing event, to perform resource transfer on the target account, to unfreeze the target account.

Optionally, after the device in the blockchain records the freezing event according to the first freezing request, the method further includes: receiving, by the device in the blockchain, a second freezing request, the second freezing request being used for requesting to freeze the target account; determining, by the device in the blockchain, whether a first transmitter address from which the first freezing request is sent is consistent with a second transmitter address from which the second freezing request is sent; and determining, if the first transmitter address is consistent with the second transmitter address, whether a time interval between a time at which the first freezing request is sent and a time at which the second freezing request is sent is greater than a preset time; rejecting the second freezing request if the time interval is less than or equal to the preset time.

In an optional embodiment, because the target account may be repeatedly frozen, to prevent someone from attacking a blockchain network by continuously submitting freezing requests, a time interval between times at which freezing requests are submitted at the same address is limited. Optionally, after receiving the first freezing request, the device in the blockchain receives the second freezing request. Then the device in the blockchain first determines whether a first address from which the first freezing request is sent and a second address from which the second freezing request is sent are the same address, and determines, if the first address and the second address are the same address, whether the time interval between the time at which the first freezing request is sent and the time at which the second freezing request is sent is greater than the preset time. The device in the blockchain accepts the second freezing request only when the time interval between the time at which the first freezing request is sent and the time at which the second freezing request is sent is greater than the preset time. The device in the blockchain rejects the second freezing request if the time interval is less than or equal to the preset time.

Optionally, after the device in the blockchain records the freezing event according to the first freezing request, the method further includes: receiving, by the device in the blockchain, a second freezing request, the second freezing request being used for requesting to freeze the target account; determining, by the device in the blockchain, whether a number of times the target account becomes frozen by the freezing lock is equal to a preset threshold; and rejecting, by the device in the blockchain, the second freezing request if the number of times the target account becomes frozen by the freezing lock is equal to the preset threshold.

In an optional embodiment, the maximum number of times of freezing of the same account may also be limited, to prevent someone from attacking a device network in the blockchain by continuously sending freezing requests to the same account. Optionally, after receiving the first freezing request, the device in the blockchain receives the second freezing request. Then the device in the blockchain determines whether a number of times the target account is set by the freezing lock to be frozen is the preset threshold. If the number of times the target account is set by the freezing lock to be frozen is equal to the preset threshold, it indicates that the target account that is currently multi-locked reaches an upper limit for a number of times the target account becomes frozen, and the device in the blockchain rejects the second freezing request. In addition, when the target account that is currently multi-locked reaches the upper limit for a number of times the target account becomes frozen, the device in the blockchain does not allow unfreezing the target account, and the user can transfer resources in the target account to a new account in a resource retrieval manner. After the number of times the target account is frozen reaches an upper limit, the target account is forbidden from being frozen, to prevent a hacker from repeatedly locking the target account more than the upper limit for freezing. Consequently, the user cannot freeze the account again, and afterward, the hacker may unfreeze one by one and repeatedly locks the accounts, causing an account risk for the user.

According to the method for processing an account in a blockchain provided in the foregoing embodiment, when the private key of the target account is leaked or suspected to be leaked, the target account is rapidly frozen, to ensure security of the target account. In an example embodiment, when the user confirms that the private key of the target account is leaked, or the user suspects that the private key of the target account is leaked, or the target account is frozen for an unknown reason, the user may immediately initiate freezing of the target account, to protect the target account at the first time by freezing the target account. When it is confirmed that the private key of the target account is not leaked, the target account becomes unfrozen. When it is confirmed that the private key of the target account is leaked, or it cannot be confirmed whether the private key of the target account is leaked, the target account remains frozen. After the user freezes the account, the account can be unfrozen only when it is confirmed that the private key of the target account is not leaked, rather than unfreezing the target account for any arbitrary reason. Optionally, because there may be a plurality of users of the target account, each user owns a private key of the target account and may freeze the target account. Therefore, the target account may be repeatedly frozen. When it is confirmed that the private key of the target account is not leaked, after the plurality of users who initiated freezing of the target account initiate the unfreezing request, the target account is unfrozen. When the target account can be repeatedly frozen, a maximum number of times the target account is repeatedly frozen may be set, to prevent the hacker from attacking the device in the blockchain by continuously freezing the target account. Accordingly, crashes of the blockchain network due to a heavy load may be avoided.

When the maximum number of times of freezing of the target account is set, when the number of times the target account is frozen reaches the maximum number of times, the target account becomes permanently frozen, and the target account cannot be unfrozen again through the unfreezing request. Accordingly, it is avoided a circumstance in which an illegal user obtains the private key of the target account and the target account is repeatedly frozen by the illegal user up to the maximum number of times, so that a real user cannot ensure security of the target account by freezing the target account, while the illegal user can seek an opportunity to unfreeze the target account, to steel resources in the target account. It should be noted that when the maximum number of times of freezing of the target account is set to 1, the target account can be substantially frozen for once but cannot be repeatedly frozen. In this case, freezing performed on the target account is permanent freezing. When the target account is permanently frozen, the user may transfer resources in the target account to a new account in a resource retrieval manner.

It should be noted that for illustrative purposes, the foregoing method embodiments are described as including a series of operations. However, a person skilled in the art should understand that the disclosure is not limited to the sequence of the described operations. Rather, according to the disclosure, some operations may use another sequence or may be simultaneously performed. In addition, a person skilled in the art should also understand that all the embodiments described in this specification are example embodiments, and the related operations and modules are not necessarily required in the disclosure.

Based on the foregoing descriptions of the embodiments, a person skilled in the art may clearly understand that the method in the foregoing embodiments may be implemented by software in addition to a necessary universal hardware platform or by hardware only. The former may be more widely implemented than the latter. Based on such an understanding, the technical solutions may be implemented in a form of a software product. The computer software product is stored in a storage medium (such as a read-only memory (ROM), a random access memory (RAM), a magnetic disk, an optical disc, etc.) and includes several instructions for instructing a terminal device (which may be a mobile phone, a computer, a server, a network device, or the like) to perform the methods described in the embodiments.

Figure 6:
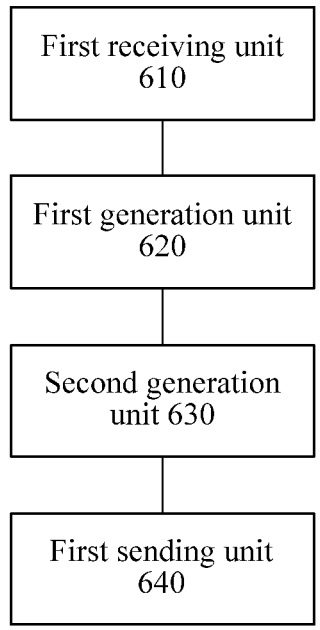
FIG. 6 is a schematic diagram of an optional apparatus for processing an account in a blockchain according to an embodiment.

According to an embodiment, an apparatus for processing an account in a blockchain for performing the method for processing an account in a blockchain is further provided. FIG. 6 is a schematic diagram of an optional apparatus for processing an account in a blockchain according to an embodiment. As shown in FIG. 6, the apparatus may include: a first receiving unit 610, a first generation unit 620, a second generation unit 630, and a first sending unit 640.

The first receiving unit 610 is configured to receive a freezing instruction sent by a user, the freezing instruction being used for instructing to freeze a target account. The first generation unit 620 is configured to generate a freezing lock according to the received freezing instruction, the freezing lock including a freezing lock public key. The second generation unit 630 is configured to generate a first freezing request according to the freezing instruction and the freezing lock public key, the first freezing request being used for requesting to freeze the target account by using the freezing lock. The first sending unit 640 is configured to send the first freezing request to a device in a blockchain, so that the device in the blockchain records a freezing event according to the first freezing request, the freezing event being used for instructing the device in the blockchain to reject to perform resource transfer on the target account.

It should be noted that, the first receiving unit 610 in an example embodiment may be configured to perform operation S202 in FIG. 2, the first generation unit 620 in an example embodiment may be configured to perform operation S204 in FIG. 2, the second generation unit 630 in an example embodiment may be configured to perform operation S206 in FIG. 2, and the first sending unit 640 in an example embodiment may be configured to perform operation S208 in FIG. 2.

It should be noted herein that examples and application scenarios implemented by the foregoing units and corresponding operations may be the same or similar but are not limited to the content disclosed in the foregoing embodiments. It should be noted that the foregoing units may be run in the hardware environment shown in FIG. 1 as a part of the apparatus, and may be implemented through software, or may be implemented through hardware.

Based on the foregoing units, a technical problem of account insecurity caused by leakage of an account private key can be solved, and a technical effect of ensuring account security when the account private key is leaked can be achieved.

Optionally, the second generation unit includes: a first obtaining module, configured to obtain an account address of the target account, a private key of the target account, and the freezing lock public key according to the freezing instruction; a first signing module, configured to sign the account address of the target account and the freezing lock public key by using the private key of the target account, to obtain first data; and a first generation module, configured to generate the first freezing request according to the first data, the first freezing request including the account address of the target account, the freezing lock public key, and a private key signature of the target account.

In an optional embodiment, when the target account is frozen, the account address of the target account is used as an identifier of the target account, and by generating the freezing lock, the freezing lock public key is submitted to the device in the blockchain, to lock the target account by using a lock corresponding to the freezing lock. In addition, the user having the private key of the target account may freeze the target account. Therefore, when generating the first freezing request, the first obtaining module obtains, according to the freezing instruction sent by the user, an account address of a target account to be frozen, a private key of the target account, and a freezing lock public key. Then the first signing module signs the account address of the target account and the freezing lock public key by using the private key of the target account, to obtain first data. Finally, the first generation module generates a first freezing request according to the first data. The first freezing request includes the account address of the target account, the freezing lock public key, and the private key signature of the target account. After the first freezing request is sent to the device in the blockchain, the device in the blockchain may reject, according to the first freezing request, to perform resource transfer on the target account, in accordance with freezing of the target account.

Optionally, the apparatus further includes: a first verification unit, configured to verify, by using the device in the blockchain, the private key signature of the target account according to the first freezing request after the first freezing request is sent to the device in the blockchain; a first recording unit, configured to record, by using the device in the blockchain, the account address of the target account and the freezing lock public key after verification is passed; and a second recording unit, configured to record, by using the device in the blockchain, the freezing event according to the first freezing request, the freezing event being used for instructing to freeze the target account by using the freezing lock public key.

In an optional embodiment, the device in the blockchain needs to verify the received freezing request, and after verification is passed, freezes the target account. Optionally, after the generated first freezing request is sent to the device in the blockchain, the first verification unit verifies, by using the device in the blockchain, the private key signature of the target account in the first freezing request. After verification is passed, the device in the blockchain determines legitimacy of recording of the account address of the target account and the freezing lock public key. The second recording unit records the account address and the freezing lock public key in the freezing event, to freeze a target account corresponding to a target address according to a freezing lock associated with the freezing lock public key. Optionally, after recording the freezing event, the device in the blockchain rejects to perform resource transfer of some types on the target account.

Optionally, the first freezing request includes a freezing type, and the first sending unit includes: a sending module, configured to send the first freezing request to the device in the blockchain, to instruct the device in the blockchain to reject, according to the first freezing request, to perform resource transfer of the freezing type on the target account.

In an optional embodiment, the first freezing request generated at the client further includes a freezing type, to perform freezing corresponding to the freezing type on the target account. Optionally, the freezing type may be but not limited to "freezing that completely forbids transactions" or "freezing that forbids only asset transfer-out", or the like. To ensure account security, the freezing type forbids at least asset transfer-out. Optionally, the client may sign the account address of the target account, the freezing lock public key, and the freezing type by using the private key of the target account, to obtain the first data, and then generates the first freezing request according to the first data. Finally, the sending module sends the first freezing request to the device in the blockchain, to reject to perform resource transfer defined in the freezing type on the target account corresponding to the target address after the device in the blockchain successfully verifies the first freezing request.

Optionally, the apparatus further includes: a second receiving unit, configured to: after the first freezing request is sent to the device in the blockchain, so that the device in the blockchain records the freezing event according to the first freezing request, receive an unfreezing instruction sent by the user, the unfreezing instruction being used for instructing to unfreeze the target account that is frozen by using the freezing lock; a third generation unit, configured to generate an unfreezing request according to the unfreezing instruction and a freezing lock private key, the unfreezing request being used for requesting to unfreeze the target account by using the freezing lock private key, and the freezing lock private key matching the freezing lock public key; and a second sending unit, configured to send the unfreezing request to the device in the blockchain, so that the device in the blockchain records an unfreezing event according to the unfreezing request, the unfreezing event being used for instructing the device in the blockchain to unfreeze the target account that is frozen by using the freezing lock.

In an optional embodiment, after the target account is frozen, the target account may become unfrozen. Optionally, the user sends the unfreezing instruction, the second receiving unit receives the unfreezing instruction sent by the user, and the third generation unit generates the unfreezing request according to the unfreezing instruction and the freezing lock private key. In response to the freezing lock private key matching the freezing lock public key that is used to freeze the target account, the target account that is frozen by using the freezing lock matching the freezing lock private key can be unfrozen by using the freezing lock private key. The second sending unit sends the unfreezing request to the device in the blockchain, and the device in the blockchain records the unfreezing event according to the unfreezing request and allows, according to the recorded unfreezing event, to perform resource transfer on the target account, to unfreeze the target account. It should be noted that the device in the blockchain can unfreeze, according to the unfreezing event recorded in the unfreezing request, the target account that is frozen by using the freezing lock matching the freezing lock private key. When the target account is frozen by a plurality of freezing locks, a single unfreezing request can unlock only a freezing lock corresponding to the freezing lock private key included in the unfreezing request, and the target account cannot be completely unfrozen.

Optionally, the third generation unit includes: a second obtaining module, configured to obtain an account address of the target account, a private key of the target account, and the freezing lock public key according to the unfreezing instruction; a second signing module, configured to sign the account address of the target account and the freezing lock public key by using the freezing lock private key, to obtain a freezing lock private key signature; a third signing module, configured to sign the account address of the target account, the freezing lock public key, and the freezing lock private key signature by using the private key of the target account, to obtain second data; and a second generation module, configured to generate the unfreezing request according to the second data, the unfreezing request including the account address of the target account, the freezing lock public key, the freezing lock private key signature, and the second data.

In an optional embodiment, when the target account is unfrozen, the account address of the target account is also used as the identifier of the target account, and the target account is unlocked by using the freezing lock private key matching the freezing lock public key provided during freezing of the target account. In addition, the user having the private key of the target account may also unfreeze the target account. Therefore, when the unfreezing request is generated, the second obtaining module obtains, according to the unfreezing instruction sent by the user, an account address of a target account to be unfrozen, a private key of the target account, and a freezing lock public key that freezes the target account. Then the second signing module signs the address of the target account and the freezing lock public key by using the freezing lock private key, to obtain a freezing lock private key signature. The third signing module signs the address of the target account, the freezing lock public key, and the freezing lock private key signature for the second time by using the private key of the target account, to obtain second data. Finally, the second generation module generates an unfreezing request according to the second data.

Optionally, the third generation unit includes: a third obtaining module, configured to obtain an account address of the target account, a private key of the target account, and the freezing lock public key according to the unfreezing instruction; a fourth signing module, configured to sign the account address of the target account, the freezing lock public key, and the freezing lock private key by using the private key of the target account, to obtain third data; and a third generation module, configured to generate the unfreezing request according to the third data, the unfreezing request including the account address of the target account, the freezing lock public key, the freezing lock private key, and the third data.

In an optional embodiment, the client may generate the unfreezing request in another manner. Optionally, the third obtaining module obtains, according to the unfreezing instruction sent by the user, an account address of a target account to be unfrozen, a private key of the target account, and a freezing lock public key that freezes the target account, then the fourth signing module signs the account address of the target account, the freezing lock public key, and the freezing lock private key by using the private key of the target account, to obtain third data, and further the third generation module generates an unfreezing request according to the third data. The unfreezing request generated according to the third data includes the account address of the target account, the freezing lock public key, the freezing lock private key, and the third data.

It should be noted that if the private key of the target account is leaked, for example, the private key of the target account is obtained by a hacker, the hacker may also freeze the target account by using the obtained private key, that is, the target account is repeatedly frozen by the hacker after the user freezes the target account, so that the target account is in a multi-locked state. When the target account is in the multi-locked state, any single "key" (or freezing lock private key) cannot completely remove the target account from the frozen state. In such a case, although the hacker repeatedly freezes the target account, and consequently, the user cannot unfreeze the target account, resources in the target account are secure.

Figure 7:
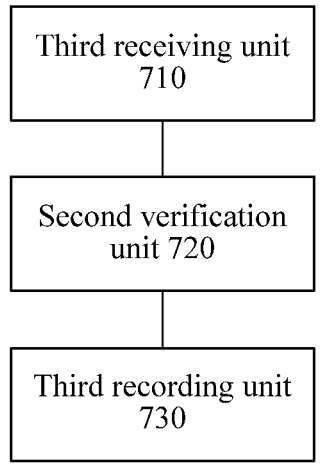
FIG. 7 is a schematic diagram of an optional apparatus for processing an account in a blockchain according to an embodiment.

According to an embodiment, another apparatus for processing an account in a blockchain for performing the method for processing an account in a blockchain is further provided. FIG. 7 is a schematic diagram of an optional apparatus for processing an account in a blockchain according to an embodiment. As shown in FIG. 7, the apparatus may include: a third receiving unit 710, a second verification unit 720, and a third recording unit 730.

The third receiving unit 710 is configured to receive, by using a device in a blockchain, a first freezing request, the first freezing request being generated according to a freezing instruction sent by a user and a freezing lock public key, the first freezing request being used for requesting to freeze a target account, a freezing lock being generated according to the freezing instruction sent by the user, and the freezing lock including the freezing lock public key. The second verification unit 720 is configured to verify, by using the device in the blockchain, the first freezing request. The third recording unit 730 is configured to record, by using the device in the blockchain, a freezing event according to the first freezing request when the first freezing request is successfully verified, the freezing event being used for instructing the device in the blockchain to reject to perform resource transfer on the target account.

It should be noted that the third receiving unit 710 in an example embodiment may be configured to perform operation S502 in FIG. 5, the second verification unit 720 in an example embodiment may be configured to perform operation S504 in FIG. 5, and the third recording unit 730 in an example embodiment may be configured to perform operation S506 in FIG. 5.

It should be noted herein that examples and application scenarios implemented by the foregoing units and corresponding operations are the same or similar but are not limited to the content disclosed in the foregoing embodiments. It should be noted that the foregoing units may be run in the hardware environment shown in FIG. 1 as a part of the apparatus, and may be implemented through software, or may be implemented through hardware.

Through the foregoing units, a technical problem of account insecurity caused by leakage of the account private key can be solved, and a technical effect of ensuring account security when the account private key is leaked can be achieved.

Optionally, the second verification unit includes: a fourth obtaining module, configured to obtain, by using the device in the blockchain, a public key of the target account; a verification module, configured to verify, by using the device in the blockchain by using the public key of the target account, first data that is in the first freezing request and that is obtained by signing an account address of the target account and the freezing lock public key by using a private key of the target account; and a fifth obtaining module, configured to record, by using the device in the blockchain, the freezing lock public key carried in the first freezing request and the account address of the target account when the first data is successfully verified.

In an optional embodiment, after the device in the blockchain receives the first freezing request, a private key signature of the target account needs to be verified, to confirm an identity of a user that initiates the first freezing request. Optionally, after receiving the first freezing request, the device in the blockchain verifies the private key signature of the target account in the first freezing request. Optionally, the fourth obtaining module obtains, by using the device in the blockchain, the public key of the target account from a certificate authority and verifies the private key signature of the target account in the first freezing request by using the public key of the target account. The blockchain usually includes a plurality of nodes. Each node verifies the private key signature of the target account according to the public key of the target account, and based on a majority of the plurality of nodes passing verification, verification of the device in the blockchain for the first freezing request is considered to be passed. After the verification of the device in the blockchain for the first freezing request is passed, the device in the blockchain obtains the account address of the target account and the freezing lock public key, so that the fifth obtaining module records, by using the device in the blockchain, the freezing event according to the obtained account address and freezing lock public key and rejects, according to the recorded freezing event, to perform any resource transfer on the target account.

Optionally, the apparatus further includes: a fourth receiving unit, configured to: after the device in the blockchain records the freezing event according to the first freezing request, receive, by using the device in the blockchain, an unfreezing request, the unfreezing request being generated according to an unfreezing instruction sent by the user and a freezing lock private key, the unfreezing request being used for requesting to unfreeze the target account that is frozen by using the freezing lock, the unfreezing request further carrying a freezing lock public key, the freezing lock public key carried in the unfreezing request being the same as the freezing lock public key carried in the freezing request, and the freezing lock private key matching the freezing lock public key; a third verification unit, configured to verify, by using the device in the blockchain, a freezing lock private key signature and second data in the unfreezing request, or verify, by using the device in the blockchain, third data in the unfreezing request, the freezing lock private key signature being obtained by signing the account address of the target account and the freezing lock public key by using the freezing lock private key, the second data being obtained by signing the account address of the target account, the freezing lock public key, and the freezing lock private key signature by using the private key of the target account, and the third data being obtained by signing the account address of the target account, the freezing lock public key, and the freezing lock private key by using the private key of the target account; and a fourth recording unit, configured to record, by using the device in the blockchain, an unfreezing event according to the account address and the freezing lock public key when the freezing lock private key signature and the second data are successfully verified or when the third data is successfully verified, the unfreezing event being used for instructing the device in the blockchain to unfreeze the target account that is frozen by using the freezing lock.

In an optional embodiment, after the target account is frozen, the target account may also be unfrozen. Optionally, the user sends the unfreezing instruction, and the client receives the unfreezing instruction sent by the user and generates the unfreezing request according to the unfreezing instruction, the freezing lock public key, and the freezing lock private key. The freezing lock private key herein matches the freezing lock public key that freezes the target account, and the target account that is frozen by using the freezing lock public key matching the freezing lock private key can be unfrozen by using the freezing lock private key. The client sends the unfreezing request to the device in the blockchain, and the fourth receiving unit receives, by using the device in the blockchain, the unfreezing request and verifies data in the unfreezing request. The unfreezing request is generated by the client. Optionally, the client may sign the account address of the target account and the freezing lock public key by using the freezing lock private key to obtain a freezing lock private key signature; then signs the account address of the target account, the freezing lock public key, and the freezing lock private key signature by using the private key of the target account, to obtain second data; and finally generates the unfreezing request according to the second data. Alternatively, the client may sign the account address of the target account, the freezing lock public key, and the freezing lock private key by using the private key of the target account, to obtain third data; and finally generates the unfreezing request according to the third data. The device in the blockchain needs to verify the signature in the unfreezing request. Optionally, when the unfreezing request is generated according to the second data, the third verification unit needs to verify, by using the device in the blockchain, the freezing lock private key signature and the second data. When the unfreezing request is generated according to the third data, the third verification unit needs to verify, by using the device in the blockchain, the third data. The fourth recording unit records, by using the device in the blockchain, the unfreezing event according to the unfreezing request when the third data is successfully verified, and allows, according to the recorded unfreezing event, to perform resource transfer on the target account, to unfreeze the target account.

Optionally, the apparatus further includes: a fifth receiving unit, configured to, after the device in the blockchain records the freezing event according to the first freezing request, receive, by using the device in the blockchain, a second freezing request, the second freezing request being used for requesting to freeze the target account; a determining unit, configured to determine, by using the device in the blockchain, whether a number of times the target account is frozen by the freezing lock is equal to a preset threshold; and a rejection unit, configured to reject, by using the device in the blockchain, the second freezing request if the number of times the target account is frozen by the freezing lock is equal to the preset threshold.

In an optional embodiment, the maximum number of times of freezing of the same account may also be limited, to prevent someone from attacking a blockchain network by continuously sending freezing requests to the same account. Optionally, after the device in the blockchain receives the first freezing request, the fifth receiving unit receives, by using the device in the blockchain, the second freezing request. Then the determining unit determines, by using the device in the blockchain, whether a number of times the target account is set by the freezing lock to be frozen is the preset threshold. If the number of times the target account is set by the freezing lock to be frozen is equal to the preset threshold, it indicates that a number of times the target account is multi-locked reaches an upper limit, and the rejection unit rejects, by using the device in the blockchain, the second freezing request. In addition, after the number of times the target account is currently multi-locked reaches the upper limit, the device in the blockchain does not allow unfreezing the target account, and the user can transfer resources in the target account to a new account in a resource retrieval manner. After the number of times the target account is frozen reaches an upper limit, the target account is forbidden from being frozen, to prevent a hacker from repeatedly locking the target account more than the upper limit for freezing. Consequently, the user cannot freeze the account again, and afterward, the hacker may unfreeze one by one and repeatedly locks the accounts, causing an account risk for the user.

It should be noted herein that examples and application scenarios implemented by the foregoing modules and corresponding operations may be the same or similar but are not limited to the content disclosed in the foregoing embodiments. It should be noted that the foregoing modules may be run in the hardware environment shown in FIG. 1 as a part of the apparatus, and may be implemented through software, or may be implemented through hardware. The hardware environment includes a network environment.

According to another aspect of the embodiments, a storage medium (also referred to as a memory) is further provided. The storage medium includes a stored program, and the program is configured to perform any one of the foregoing methods when run.

According to an embodiment, a terminal (also referred to as a computer device) for performing the foregoing method for processing an account in a blockchain is further provided.

Figure 8:
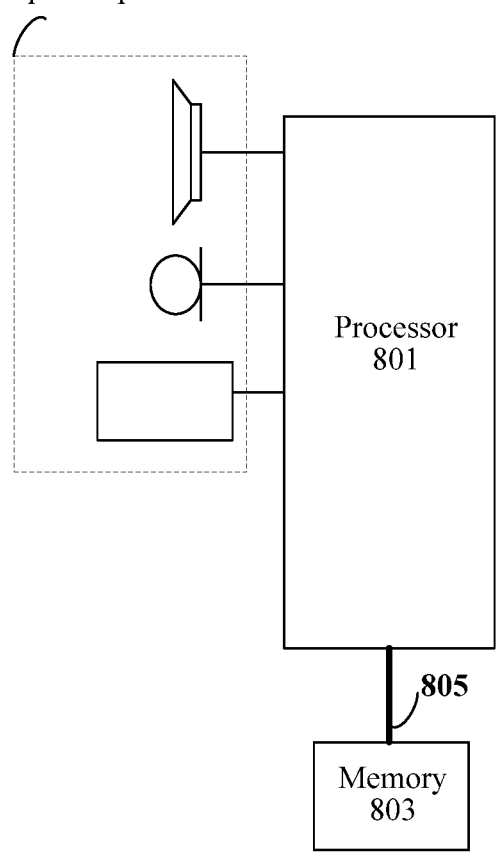
FIG. 8 is a structural block diagram of a terminal according to an embodiment.

FIG. 8 is a structural block diagram of a terminal according to an embodiment. As shown in FIG. 8, the terminal may include: one or more processors 801 (only one is shown in FIG. 8 for brevity of explanation), a memory 803, and a transmission apparatus 805 (such as the sending apparatus in the foregoing embodiments). As shown in FIG. 8, the terminal may further include an input/output device 807.

The memory 803 may be configured to store a software program and a module such as a program instruction/module corresponding to the method and apparatus for processing an account in a blockchain in the embodiments, and the processor 801 runs the software program and the module stored in the memory 803, to execute various function applications and data processing, that is, implement the foregoing method for processing an account in a blockchain. The memory 803 may include a high-speed random memory, and may also include a nonvolatile memory such as one or more magnetic storage apparatuses, a flash memory, or another nonvolatile solid-state memory. In some examples, the memory 803 may further include memories remotely disposed relative to the processor 801, and these remote memories may be connected to the terminal through a network. Examples of the network include, but are not limited to, the Internet, an intranet, a local area network, a mobile communications network, and a combination thereof.

The transmission apparatus 805 is configured to receive or send data via a network and may further be configured to transmit data of the processor and the memory. Examples of the network may include a wired network and/or a wireless network. In an example, the transmission apparatus 805 includes a network interface controller (NIC) that may be connected to another network device and a router by using a network cable, thereby communicating with the Internet or a local area network. In an example, the transmission apparatus 805 is a radio frequency (RF) module that is configured to communicate with the Internet in a wireless manner.

Optionally, the memory 803 is configured to store an application program.

The processor 801 may call, by using the transmission apparatus 805, the application program stored in the memory 803, to perform the following operations: receiving a freezing instruction sent by a user, the freezing instruction being used for instructing to freeze a target account; generating a freezing lock according to the received freezing instruction, the freezing lock including a freezing lock public key; generating a first freezing request according to the freezing instruction and the freezing lock public key, the first freezing request being used for requesting to freeze the target account by using the freezing lock; and sending the first freezing request to a device in a blockchain, so that the device in the blockchain records a freezing event according to the first freezing request, the freezing event being used for instructing the device in the blockchain to reject to perform resource transfer on the target account.

The processor 801 is further configured to perform the following operations: obtaining an account address of the target account, a private key of the target account, and the freezing lock public key according to the freezing instruction; signing the account address of the target account and the freezing lock public key by using the private key of the target account, to obtain first data; and generating the first freezing request according to the first data, the first freezing request including the account address of the target account, the freezing lock public key, and a private key signature of the target account.

The processor 801 is further configured to perform the following operations: verifying, by using the device in the blockchain, the private key signature of the target account according to the first freezing request; recording, by using the device in the blockchain, the account address of the target account and the freezing lock public key after verification is passed; and recording, by using the device in the blockchain, the freezing event according to the first freezing request, the freezing event being used for instructing to freeze the target account by using the freezing lock public key.

The processor 801 is further configured to perform the following operations: sending the first freezing request to the device in the blockchain, to instruct the device in the blockchain to reject, according to the first freezing request, to perform resource transfer of the freezing type on the target account.

The processor 801 is further configured to perform the following operations: receiving an unfreezing instruction sent by the user, the unfreezing instruction being used for instructing to unfreeze the target account that is frozen by using the freezing lock; generating an unfreezing request according to the unfreezing instruction and a freezing lock private key, the unfreezing request being used for requesting to unfreeze the target account by using the freezing lock private key, and the freezing lock private key matching the freezing lock public key; and sending the unfreezing request to the device in the blockchain, so that the device in the blockchain records an unfreezing event according to the unfreezing request, the unfreezing event being used for instructing the device in the blockchain to unfreeze the target account that is frozen by using the freezing lock.

The processor 801 is further configured to perform the following operations: obtaining an account address of the target account, a private key of the target account, and the freezing lock public key according to the unfreezing instruction; signing the account address of the target account and the freezing lock public key by using the freezing lock private key, to obtain a freezing lock private key signature; signing the account address of the target account, the freezing lock public key, and the freezing lock private key signature by using the private key of the target account, to obtain second data; and generating the unfreezing request according to the second data, the unfreezing request including the account address of the target account, the freezing lock public key, the freezing lock private key signature, and the second data.

The processor 801 is further configured to perform the following operations: obtaining an account address of the target account, a private key of the target account, and the freezing lock public key according to the unfreezing instruction; signing the account address of the target account, the freezing lock public key, and the freezing lock private key by using the private key of the target account, to obtain third data; and generating the unfreezing request according to the third data, the unfreezing request including the account address of the target account, the freezing lock public key, the freezing lock private key, and the third data.

The processor 801 is further configured to perform the following operations: receiving, by using a device in a blockchain, a first freezing request, the first freezing request being generated according to a freezing instruction sent by a user and a freezing lock public key, the first freezing request being used for requesting to freeze a target account, a freezing lock being generated according to the freezing instruction sent by the user, and the freezing lock including the freezing lock public key; verifying, by using the device in the blockchain, the first freezing request; and recording, by using the device in the blockchain, a freezing event according to the first freezing request when the first freezing request is successfully verified, the freezing event being used for instructing the device in the blockchain to reject to perform resource transfer on the target account.

The processor 801 is further configured to perform the following operations: obtaining, by using the device in the blockchain, a public key of the target account; verifying, by using the device in the blockchain by using the public key of the target account, first data that is in the first freezing request and that is obtained by signing an account address of the target account and the freezing lock public key by using a private key of the target account; and recording, by using the device in the blockchain, the freezing lock public key carried in the first freezing request and the account address of the target account when the first data is successfully verified.

The processor 801 is further configured to perform the following operations: receiving, by using the device in the blockchain, an unfreezing request, the unfreezing request being generated according to an unfreezing instruction sent by the user and a freezing lock private key, and the unfreezing request being used for requesting to unfreeze the target account that is frozen by using the freezing lock; verifying, by using the device in the blockchain, a freezing lock private key signature and second data in the unfreezing request, or verifying, by using the device in the blockchain, third data in the unfreezing request, the freezing lock private key signature being obtained by signing the account address of the target account and the freezing lock public key by using the freezing lock private key, the second data being obtained by signing the account address of the target account, the freezing lock public key, and the freezing lock private key signature by using the private key of the target account, and the third data being obtained by signing the account address of the target account, the freezing lock public key, and the freezing lock private key by using the private key of the target account; and recording, by using the device in the blockchain, an unfreezing event according to the account address and the freezing lock public key when the freezing lock private key signature and the second data are successfully verified or when the third data is successfully verified, the unfreezing event being used for instructing the device in the blockchain to unfreeze the target account that is frozen by using the freezing lock.

The processor 801 is further configured to perform the following operations: receiving, by using the device in the blockchain, a second freezing request, the second freezing request being used for requesting to freeze the target account; determining, by using the device in the blockchain, whether a number of times the target account is frozen by the freezing lock is equal to a preset threshold; and rejecting, by using the device in the blockchain, the second freezing request if the number of times the target account is frozen by the freezing lock is equal to the preset threshold.

According to an example embodiment, a solution of the terminal for performing the method for processing an account in a blockchain is provided. The freezing lock is generated, and the target account is frozen by using the freezing lock public key in the freezing lock, to ensure security of the target account, and to achieve a technical effect of ensuring account security when the account private key is leaked. Accordingly, the solution according to an example embodiment can solve the technical problem of insecurity of an account caused by leakage of the account private key.

Optionally, the examples described in the foregoing embodiments may be referred to, and repetitive details are not described herein.

A person of ordinary skill in the art should understand that the structure shown in FIG. 8 is only schematic and is provided as an example only. Alternatively, the terminal may be a terminal device such as a smartphone (e.g., an Android mobile phone or an iOS mobile phone), a tablet computer, a palmtop computer, a mobile Internet device (MID), or a PAD. FIG. 8 does not limit the structure of the electronic apparatus. For example, the terminal may further include more or fewer components (such as a network interface and a display apparatus) than those shown in FIG. 8, or has a configuration different from that shown in FIG. 8.

A person of ordinary skill in the art should understand that all or some of the operations of the methods of the foregoing embodiments may be implemented by a program instructing relevant hardware of the terminal device. The program may be stored in a computer readable storage medium. The storage medium may be a flash disk, a ROM, a RAM, a magnetic disk, an optical disc, or the like.

An example embodiment of the disclosure further provides a storage medium. Optionally, in an example embodiment, the storage medium can store program code for performing the method for processing an account in a blockchain.

Optionally, in an example embodiment, the storage medium may be located in at least one of a plurality network devices in the network shown in the foregoing embodiments.

Optionally, in an example embodiment, the storage medium is configured to store program code for performing the following operations:

S1: Receive a freezing instruction sent by a user.

S2: Generate a freezing lock according to the received freezing instruction.

S3: Generate a first freezing request according to the freezing instruction and the freezing lock public key.

S4: Send the first freezing request to a device in a blockchain, so that the device in the blockchain records a freezing event according to the first freezing request.

Optionally, the storage medium is further configured to store program code for performing the following operations: obtaining an account address of the target account, a private key of the target account, and the freezing lock public key according to the freezing instruction; signing the account address of the target account and the freezing lock public key by using the private key of the target account, to obtain first data; and generating the first freezing request according to the first data, the first freezing request including the account address of the target account, the freezing lock public key, and a private key signature of the target account.

Optionally, the storage medium is further configured to store program code for performing the following operations: verifying, by using the device in the blockchain, the private key signature of the target account according to the first freezing request; recording, by using the device in the blockchain, the account address of the target account and the freezing lock public key after verification is passed; and recording, by using the device in the blockchain, the freezing event according to the first freezing request, the freezing event being used for instructing to freeze the target account by using the freezing lock public key.

Optionally, the storage medium is further configured to store program code for performing the following operations: sending the first freezing request to the device in the blockchain, to instruct the device in the blockchain to reject, according to the first freezing request, to perform resource transfer of the freezing type on the target account.

Optionally, the storage medium is further configured to store program code for performing the following operations: receiving an unfreezing instruction sent by the user, the unfreezing instruction being used for instructing to unfreeze the target account that is frozen by using the freezing lock; generating an unfreezing request according to the unfreezing instruction and a freezing lock private key, the unfreezing request being used for requesting to unfreeze the target account by using the freezing lock private key, and the freezing lock private key matching the freezing lock public key; and sending the unfreezing request to the device in the blockchain, so that the device in the blockchain records an unfreezing event according to the unfreezing request, the unfreezing event being used for instructing the device in the blockchain to unfreeze the target account that is frozen by using the freezing lock.

Optionally, the storage medium is further configured to store program code for performing the following operations: obtaining an account address of the target account, a private key of the target account, and the freezing lock public key according to the unfreezing instruction; signing the account address of the target account and the freezing lock public key by using the freezing lock private key, to obtain a freezing lock private key signature; signing the account address of the target account, the freezing lock public key, and the freezing lock private key signature by using the private key of the target account, to obtain second data; and generating the unfreezing request according to the second data, the unfreezing request including the account address of the target account, the freezing lock public key, the freezing lock private key signature, and the second data.

Optionally, the storage medium is further configured to store program code for performing the following operations: obtaining an account address of the target account, a private key of the target account, and the freezing lock public key according to the unfreezing instruction; signing the account address of the target account, the freezing lock public key, and the freezing lock private key by using the private key of the target account, to obtain third data; and generating the unfreezing request according to the third data, the unfreezing request including the account address of the target account, the freezing lock public key, the freezing lock private key, and the third data.

Optionally, the storage medium is further configured to store program code for performing the following operations: receiving, by using a device in a blockchain, a first freezing request, the first freezing request being generated according to a freezing instruction sent by a user and a freezing lock public key, the first freezing request being used for requesting to freeze a target account, a freezing lock being generated according to the freezing instruction sent by the user, and the freezing lock including the freezing lock public key; verifying, by using the device in the blockchain, the first freezing request; and recording, by using the device in the blockchain, a freezing event according to the first freezing request when the first freezing request is successfully verified, the freezing event being used for instructing the device in the blockchain to reject to perform resource transfer on the target account.

Optionally, the storage medium is further configured to store program code for performing the following operations: obtaining, by using the device in the blockchain, a public key of the target account; verifying, by using the device in the blockchain by using the public key of the target account, first data that is in the first freezing request and that is obtained by signing an account address of the target account and the freezing lock public key by using a private key of the target account; and recording, by using the device in the blockchain, the freezing lock public key carried in the first freezing request and the account address of the target account when the first data is successfully verified.

Optionally, the storage medium is further configured to store program code for performing the following operations: receiving, by using the device in the blockchain, an unfreezing request, the unfreezing request being generated according to an unfreezing instruction sent by the user and a freezing lock private key, and the unfreezing request being used for requesting to unfreeze the target account that is frozen by using the freezing lock; verifying, by using the device in the blockchain, a freezing lock private key signature and second data in the unfreezing request, or verifying, by using the device in the blockchain, third data in the unfreezing request, the freezing lock private key signature being obtained by signing the account address of the target account and the freezing lock public key by using the freezing lock private key, the second data being obtained by signing the account address of the target account, the freezing lock public key, and the freezing lock private key signature by using the private key of the target account, and the third data being obtained by signing the account address of the target account, the freezing lock public key, and the freezing lock private key by using the private key of the target account; and recording, by using the device in the blockchain, an unfreezing event according to the account address and the freezing lock public key when the freezing lock private key signature and the second data are successfully verified or when the third data is successfully verified, the unfreezing event being used for instructing the device in the blockchain to unfreeze the target account that is frozen by using the freezing lock.

Optionally, the storage medium is further configured to store program code for performing the following operations: receiving, by using the device in the blockchain, a second freezing request, the second freezing request being used for requesting to freeze the target account; determining, by using the device in the blockchain, whether a number of times the target account is frozen by the freezing lock is equal to a preset threshold; and rejecting, by using the device in the blockchain, the second freezing request if the number of times the target account is frozen by the freezing lock is equal to the preset threshold.

Optionally, the examples described in the foregoing embodiments may be referred to and repetitive details are not described herein.

Optionally, in an example embodiment, the storage medium may include, but is not limited to: any medium that can store program code, such as a USB flash drive, a ROM, a RAM, a removable hard disk, a magnetic disk, or an optical disc.

The sequence numbers of the foregoing embodiments are merely for description purpose and do not indicate the preference of the embodiments.

If the integrated units in the foregoing embodiments are implemented in a form of software functional units and are sold or used as an independent product, the units may be stored in a computer readable storage medium. Based on such an understanding, the technical solutions essentially, or the part contributing to the existing technology, or all or some of the technical solutions may be implemented in a form of a software product. The computer software product is stored in a storage medium and includes several instructions for instructing one or more computer devices (which may be a personal computer, a server, a network device, or the like) to perform all or some of operations of the methods in the embodiments.

In the foregoing embodiments, descriptions of the embodiments have different emphases, and as for parts that are not described in detail in an embodiment, reference can be made to the relevant descriptions of the other embodiments.

In the several embodiments provided in the disclosure, it should be understood that the disclosed client may be implemented in other manners. The described apparatus embodiments are merely schematic. For example, division of the units is merely division of logic functions, and there may be another division manner during actual implementation. For example, multiple units or components may be combined or may be integrated into another system, or some features may be omitted or not be executed. In addition, the displayed or discussed mutual coupling, or direct coupling, or communication connections may be implemented through some interfaces. Indirect coupling or communication connections between the units or modules may be implemented in electronic or other forms.

The units described as separate parts may or may not be physically separate, and the parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments may be integrated into one processing unit, or each of the units may exist alone physically, or two or more units may be integrated into one unit. The integrated units may be implemented in a form of hardware or may be implemented in a form of a software functional unit.

The foregoing embodiments are merely intended for describing the technical solutions, but not for limiting the disclosure. Although the disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments.

What is claimed is:

1. A method for processing an account in a blockchain, comprising:
   receiving, by a computer device, a freezing instruction with respect to a target account;
   generating, by the computer device, a freezing lock based on the received freezing instruction, the freezing lock comprising a freezing lock public key;
   generating, by the computer device, a first freezing request based on the freezing instruction and the freezing lock public key; and
   transmitting, by the computer device, the first freezing request to a device in the blockchain, the first freezing request being a request based on which the target account is frozen by using the freezing lock and resource transfer of the target account is denied.

2. The method according to claim 1, wherein the generating the first freezing request comprises:
   obtaining an account address of the target account, a private key of the target account, and the freezing lock public key based on the freezing instruction;
   signing the account address of the target account and the freezing lock public key by using the private key of the target account, to obtain first data; and
   generating the first freezing request based on the first data, the first freezing request comprising the account address of the target account, the freezing lock public key, and a private key signature of the target account.

3. The method according to claim 2, wherein the target account is frozen based on verification of the private key signature of the target account according to the first freezing request.

4. The method according to claim 1, wherein the first freezing request comprises a freezing type, and resource transfer of the freezing type of the target account is denied based on the first freezing request.

5. The method according to claim 1, further comprising, after the transmitting the first freezing request:
   receiving, by the computer device, an unfreezing instruction with respect to the target account that is frozen by using the freezing lock;
   generating, by the computer device, an unfreezing request based on the unfreezing instruction and a freezing lock private key the freezing lock private key matching the freezing lock public key; and
   transmitting, by the computer device, the unfreezing request to the device in the blockchain, the unfreezing request being a request upon which the target account is unfrozen by using the freezing lock private key, the freezing lock private key matching the freezing lock public key.

6. The method according to claim 5, wherein the generating the unfreezing request comprises:
   obtaining an account address of the target account, a private key of the target account, and the freezing lock public key based on the unfreezing instruction;
   signing the account address of the target account and the freezing lock public key by using the freezing lock private key, to obtain a freezing lock private key signature;
   signing the account address of the target account, the freezing lock public key, and the freezing lock private key signature by using the private key of the target account, to obtain second data; and
   generating the unfreezing request based on the second data, the unfreezing request comprising the account address of the target account, the freezing lock public key, the freezing lock private key signature, and the second data.

7. The method according to claim 5, wherein the generating the unfreezing request comprises:
   obtaining an account address of the target account, a private key of the target account, and the freezing lock public key based on the unfreezing instruction;
   signing the account address of the target account, the freezing lock public key, and the freezing lock private key by using the private key of the target account, to obtain third data; and
   generating the unfreezing request based on the third data, the unfreezing request comprising the account address of the target account, the freezing lock public key, the freezing lock private key, and the third data.

8. An apparatus for processing an account in a blockchain, comprising:
   at least one memory operable to store program code; and
   at least one processor operable to read the program code and operate as instructed by the program code, the program code comprising:
   first receiving code configured to cause the at least one processor to receive a freezing instruction with respect to a target account;
   first generation code configured to cause the at least one processor to generate a freezing lock based on the received freezing instruction, the freezing lock comprising a freezing lock public key;
   second generation code configured to cause the at least one processor to generate a first freezing request based on the freezing instruction and the freezing lock public key; and
   first transmitting code configured to cause the at least one processor to transmit the first freezing request to a device in the blockchain, the first freezing request being a request based on which the target account is frozen by using the freezing lock and resource transfer of the target account is denied.

9. The apparatus according to claim 8, wherein the second generation code comprises:
   first obtaining subcode configured to cause the at least one processor to obtain an account address of the target account, a private key of the target account, and the freezing lock public key based on the freezing instruction;
   first signing subcode configured to cause the at least one processor to sign the account address of the target account and the freezing lock public key by using the private key of the target account, to obtain first data; and
   first generation subcode configured to cause the at least one processor to generate the first freezing request based on the first data, the first freezing request comprising the account address of the target account, the freezing lock public key, and a private key signature of the target account.

10. The apparatus according to claim 9, wherein the target account is frozen based on verification of the private key signature of the target account according to the first freezing request.

11. The apparatus according to claim 8, wherein the first freezing request comprises a freezing type, and resource transfer of the freezing type of the target account is denied based on the first freezing request.

12. The apparatus according to claim 8, wherein the program code further comprises:
   second receiving code configured to cause the at least one processor to receive an unfreezing instruction with respect to the target account that is frozen by using the freezing lock;
   third generation code configured to cause the at least one processor to generate an unfreezing request based on the unfreezing instruction and a freezing lock private key, the freezing lock private key matching the freezing lock public key; and
   second transmitting code configured to cause the at least one processor to transmit the unfreezing request to the device in the blockchain, the unfreezing request being a request upon which the target account is unfrozen by using the freezing lock private key, the freezing lock private key matching the freezing lock public key.

13. The apparatus according to claim 12, wherein the third generation code comprises:
   second obtaining subcode configured to cause the at least one processor to obtain an account address of the target account, a private key of the target account, and the freezing lock public key based on the unfreezing instruction;
   second signing subcode configured to cause the at least one processor to sign the account address of the target account and the freezing lock public key by using the freezing lock private key, to obtain a freezing lock private key signature;
   third signing subcode configured to cause the at least one processor to sign the account address of the target account, the freezing lock public key, and the freezing lock private key signature by using the private key of the target account, to obtain second data; and
   second generation subcode configured to cause the at least one processor to generate the unfreezing request based on the second data, the unfreezing request comprising the account address of the target account, the freezing lock public key, the freezing lock private key signature, and the second data.

14. The apparatus according to claim 12, wherein the third generation code comprises:
   third obtaining subcode configured to cause the at least one processor to obtain an account address of the target account, a private key of the target account, and the freezing lock public key based on the unfreezing instruction;
   fourth signing subcode configured to cause the at least one processor to sign the account address of the target account, the freezing lock public key, and the freezing lock private key by using the private key of the target account, to obtain third data; and
   third generation subcode configured to cause the at least one processor to generate the unfreezing request based on the third data, the unfreezing request comprising the account address of the target account, the freezing lock public key, the freezing lock private key, and the third data.

15. A non-transitory computer storage medium storing instructions executable by at least one processor to perform:
   receiving a freezing instruction with respect to a target account;
   generating a freezing lock based on the received freezing instruction, the freezing lock comprising a freezing lock public key;
   generating a first freezing request based on the freezing instruction and the freezing lock public key; and
   transmitting the first freezing request to a device in a blockchain, the first freezing request being a request based on which the target account is frozen by using the freezing lock and resource transfer of the target account is denied.

16. The computer storage medium according to claim 15, wherein the generating the first freezing request comprises:
   obtaining an account address of the target account, a private key of the target account, and the freezing lock public key based on the freezing instruction;
   signing the account address of the target account and the freezing lock public key by using the private key of the target account, to obtain first data; and
   generating the first freezing request based on the first data, the first freezing request comprising the account address of the target account, the freezing lock public key, and a private key signature of the target account.

17. The computer storage medium according to claim 16, wherein the target account is frozen based on verification of the private key signature of the target account according to the first freezing request.

18. The computer storage medium according to claim 15, wherein the first freezing request comprises a freezing type, and resource transfer of the freezing type of the target account is denied based on the first freezing request.

19. The computer storage medium according to claim 15, wherein the instructions are executable by the at least one processor to further perform, after the transmitting the first freezing request:
   receiving an unfreezing instruction with respect to the target account that is frozen by using the freezing lock;
   generating an unfreezing request based on the unfreezing instruction and a freezing lock private key the freezing lock private key matching the freezing lock public key; and
   transmitting the unfreezing request to the device in the blockchain, the unfreezing request being a request upon which the target account is unfrozen by using the freezing lock private key, the freezing lock private key matching the freezing lock public key.

20. The method according to claim 19, wherein the generating the unfreezing request comprises:
- obtaining an account address of the target account, a private key of the target account, and the freezing lock public key based on the unfreezing instruction;
- signing the account address of the target account and the freezing lock public key by using the freezing lock private key, to obtain a freezing lock private key signature;
- signing the account address of the target account, the freezing lock public key, and the freezing lock private key signature by using the private key of the target account, to obtain second data; and
- generating the unfreezing request based on the second data, the unfreezing request comprising the account address of the target account, the freezing lock public key, the freezing lock private key signature, and the second data.

* * * * *